United States Patent

[11] 3,561,371

| [72] | Inventor | Charles K. Kummer |
| | | St. Louis, Mo. |
| [21] | Appl. No. | 814,923 |
| [22] | Filed | Apr. 10, 1969 |
| [45] | Patented | Feb. 9, 1971 |
| [73] | Assignee | Ralston Purina Company |
| | | St. Louis, Mo. |
| | | a corporation of Missouri |

[54] EXTRUDER DOOR
10 Claims, 3 Drawing Figs.

[52] U.S. Cl. ............................................. 107/14
[51] Int. Cl. ........................................... A21c 11/16
[50] Field of Search........................................... 49/394;
109/74; 220/55.3, 55E, 55G, 55N, 55J, 57, 38;
107/14, 14.4, 14.5

[56] References Cited
UNITED STATES PATENTS
| 1,230,316 | 6/1917 | Napier............................ | 220/57 |
| 1,800,396 | 4/1931 | Mohun............................ | 49/394 |
| 2,257,695 | 9/1941 | Lihotzky......................... | 107/14 |
| 3,119,512 | 1/1964 | Foster............................ | 220/38 |

*Primary Examiner*—Henry S. Jaudon
*Attorneys*—Robert W. Brukardt and Lawrence J. Hurst ABSTRACT: An extruder is provided with an end plate having a hinge pin on one side thereof and an angled abutment surface on the other side thereof. The extruder door is provided with a slot adapted to receive the hinge pin and an abutment surface for engagement with the angled surface of the end plate. A shaft is connected to the door and provided with means for reciprocal movement for controlling the movement of the extruder door with respect to the end plate. More particularly, when the shaft is moved in one direction, the abutment faces of the door and end plate are disengaged, permitting said door to be pivoted away from the end plate. When the shaft is moved in the opposite direction, the abutment faces of the door and end plate are brought into engagement, thereby forcing the door into fluidtight engagement with the end plate.

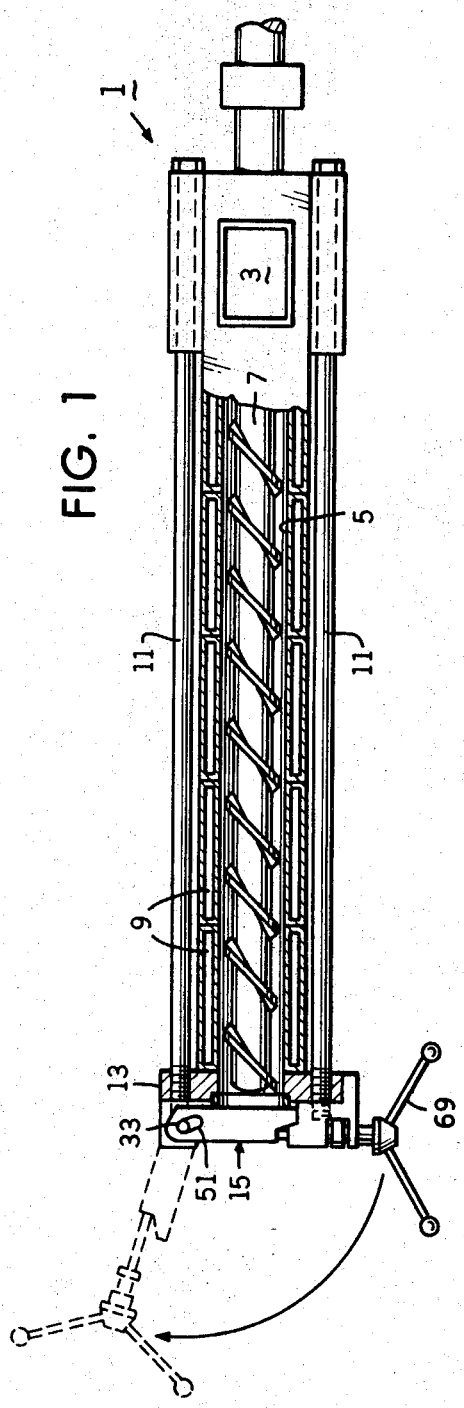
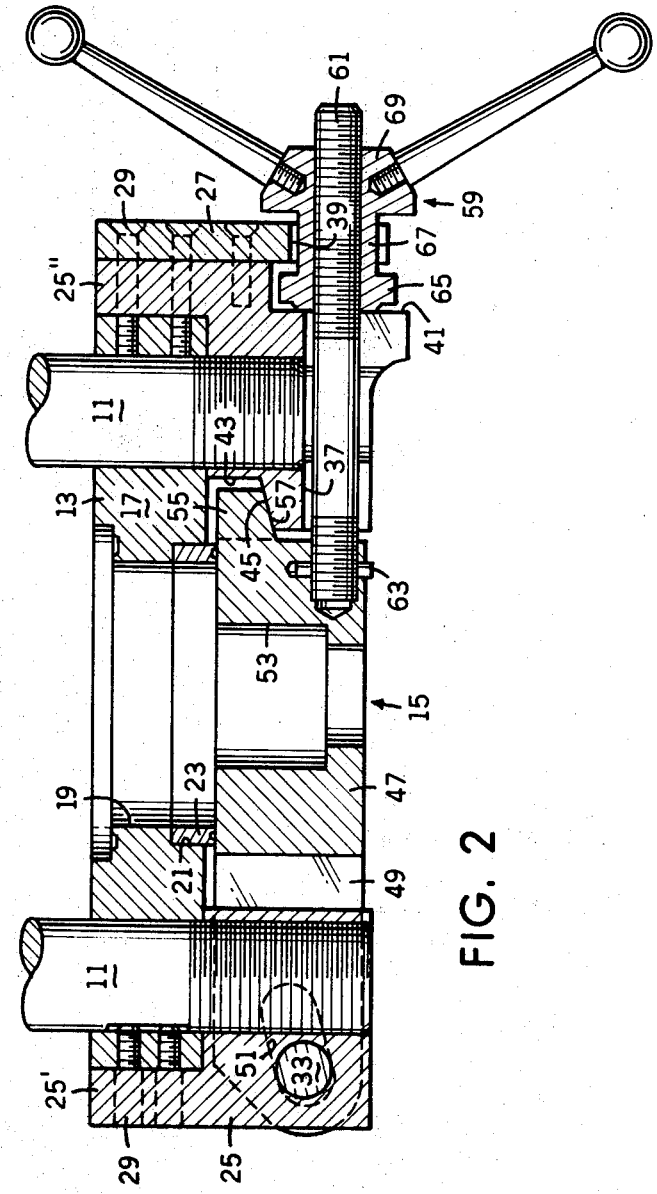

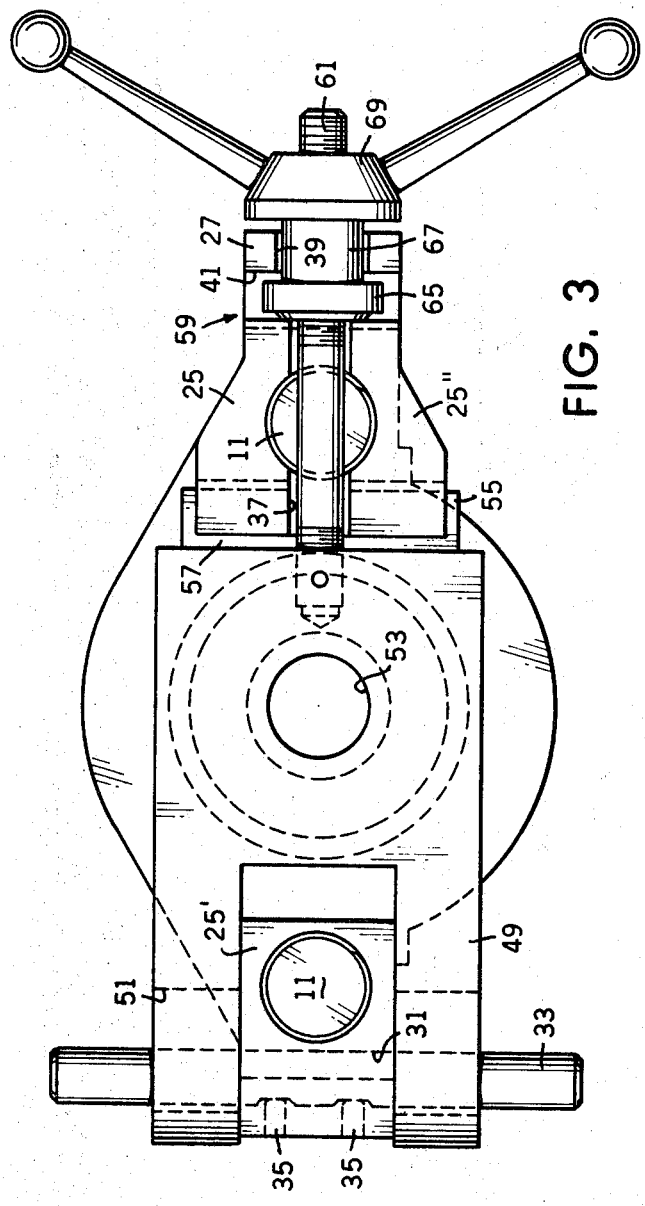

3,561,371

EXTRUDER DOOR

BACKGROUND OF THE INVENTION

Extruders of the type shown herein are well-known in the art. Primarily, they are used in the process of extruding farinaceous material or farinaceous and proteinaceous material. These extruders utilize a construction having an end plate with a door connected thereto having the extruder orifice or die located within said door. Primarily, these prior art extruder devices had provisions for maintaining the door in engagement with the end plate by use of a large bolt and nut assembly. Due to the the high pressures involved in extrusion, this bolt and nut assembly, of necessity, was large and required the use of power tools, such as a pneumatic wrench, to effect their removal and enable the door to be swung away from the end plate. By utilizing such a bolt and nut assembly the ready removal of the door from the end plate was unattainable. This was disadvantageous, since it may be important to obtain a quick opening of the door in order to prevent the extruder screw from becoming bound in the extrusion barrel when a malfunction occurs. In addition, such bolt and nut arrangements were unsatisfactory, since, by necessity, the operator was required to stand in close proximity to the end of the extruder barrel, thereby subjecting himself to steam and hot materials when the extruder door was open. Further, such arrangements were cumbersome, requiring large power tools to affect the opening of the extruder door.

Other prior art arrangements provided for the end plate to have grooves therein into which flanges on the extruder door were inserted. This necessitated the whole extruder door to be rotated to effect the locking engagement between the flanges and grooves and also required that close tolerances be maintained on both the extruder door and end plate to insure that a proper fit was attained enabling the locking to occur. In addition, this arrangement had the aforementioned disadvantages of preventing ready removal of the door from the end plate and of requiring the operator to be in direct line with the extruder barrel such that steam and hot material were likely to burn the operator when the extruder door was opened.

In an attempt to overcome these aforementioned disadvantageous features, applicant has provided a novel arrangement for connecting the extruder door to the end plate. More particularly, a novel arrangement is provided which enables ready release of the door from the end plate without the necessity of a nut and bolt arrangement and which enables the operator to accomplish such release with a minimum of effort. The extruder door of the present invention is provided with a slot for sliding engagement with a pivot pin provided on one side of the end plate, and said door is provided with an angled or inclined abutment surface for sliding engagement with an angled or inclined abutment surface provided on the other side of the said end plate. By controlling the movement of the angled or inclined surface of the door along the angled or inclined surface of the end plate, the door may be moved into and out of engagement with the end plate in a simplified manner.

It is therefore the object of the present invention to provide a simplified extruder door which is maintained in engagement with the end plate by use of the mating engagement of 2 angled or inclined surfaces.

It is another object of the present invention to provide control means at the side of the extruder for controlling the movement of the angled surface of the door on the angled surface of the end plate.

It is another object of the present invention to provide a simplified extruder door structure which permits locking engagement thereof with an extruder end plate without the use of a large nut and bolt assembly or of a flange and groove arrangement.

It is still another object of the present invention to provide an extruder door structure which permits the opening of said door rapidly and without the necessity of utilizing large power tools.

These and other objects and advantages of the present invention will become more apparent from the description hereinafter.

Briefly, the present invention comprises an extruder having an end plate, said end plate having a hinge pin on one side thereof and an angled surface on the other side thereof, an extruder door having a slot adapted to receive said hinge pin and an angled surface for sliding engagement with said angled surface on said end plate and means connected to said door for controlling said sliding engagement between said angled surfaces, whereby when said angled surfaces are disengaged, the extruder door may be pivoted from said end plate and when said angled surfaces are in engagement, said extruder door is urged to a position establishing a pressure fluid seal with said end plate.

BRIEF DESCRIPTION OF THE DRAWINGS

In the accompanying drawings, in which one of various possible embodiments of the invention is illustrated and wherein like numerals designate like parts, FIG. 1 is a top view of an extruder embodying the present invention;

FIG. 2 is an enlarged top view of the extruder door of FIG. 1 in its closed position and I FIG. 3 is a front view showing the extruder door of FIG. 1 in its closed position.

BRIEF DESCRIPTION OF THE PREFERRED EMBODIMENTS

Referring now to FIG. 1, an extruder 1 is shown which has a design to generally represent extruders which are well-known in the art. An inlet 3 is provided for feeding material to the extruder barrel 5 having a screw 7 therein. The extruder 1 may be provided with a plurality of steam or water jackets 9, which are connected and held together by the extruder tie rods 11. The tie rods 11 are connected to one end of the extruder and the other end of the rods are threadedly received in an end plate 13. An extruder door assembly 15 is provided at the discharge end of the extruder 1 and connected to the end plate 13.

Referring now to FIGS. 2 and 3, the end plate 13 is provided with a sleeve portion 17 having an axially extending passage 19 which is in alignment with the barrel bore 5 of the extruder 1 to permit passage of the material being extruded therethrough. A counterbore 21 is provided in the outward extending portion of the sleeve 17 adjacent to the passage 19. An annular soft metallic seal ring 23 is provided in the counterbore 21 about the passage 19. The end plate 13 includes a mounting portion 25 extending outwardly from the sleeve 17 and about the passage 19. The mounting portion 25 consists of a hinge block 25' connected to the leftward side of the extruder 1 and a lock block 25" connected to the rightward side of said extruder. In addition, an abutment plate 27 is connected to the rightward side of the lock block 25". The mounting portion 25, including the hinge and lock blocks 25' and 25", and abutment plate 27 are connected to the sleeve 17 by suitable means such as bolts 29. However, it should be understood that the sleeve 17, mounting portion 25 and abutment plate 27 may be integrally formed, if desired.

An aperture 31 is provided in the hinge block 25' of the mounting portion 25 adjacent to the left side thereof (as viewed in FIGS. 2 and 3) and a hinge or pivot pin 33 is maintained in said aperture by means of setscrews 35. The lock block 25" of the mounting portion 25 is provided with a horizontally extending groove 37 and the abutment plate 27 has a horizontally extending groove 39 therethrough in registry with the groove 37.

It should be noted that a recess 41 is provided in the lock block 25" to define an opening between said mounting portion and the abutment plate 27 such that said opening is between the grooves 37 and 39. In addition, it should be noted that the interior of the lock block 25" of the mounting portion 25 is provided with an undercut 43. The undercut 43 is provided with an angled or inclined abutment surface 45, which is flame hardened or coated with a wear resistant material such that another metal part may slide upon said inclined surface easily. It has been found that the angle of this inclined surface should be 15° but not in excess of 20° to the opening 19 to obtain the best operation of the extruder door assembly 15.

An extruder door 47 s is provided with a bifurcated portion 49 having slots 51 therein. The slots 51 are adapted to receive the pivot pin 33 and thereby permit the extruder door 47 to be connected to the end plate 13. The hinge pin 33 is placed through the slots 51 and the aperture 31 to connect the door 47 to the end plate 13 and said hinge pin is maintained in place or position by the setscrews 35, as previously described. The slots 51 are adapted such that the extruder door 47 not only pivots about the pin 33 but is permitted a limited amount of horizontal movement. The door 47 is provided with a centrally located aperture 53 for alignment with the passage 19 in the extruder end plate 13. The aperture 53 is adapted to receive a die plate or orifice through which the material being extruded is passed. The right side of the extruder door 47 is provided with a flange portion 55, and said flange is provided with a face 57, which defines an inclined angle. The abutment or inclined face 57 is adapted for sliding movement along the inclined surface 45 of the end plate 13. It should be noted that the sides of the slots 51 are provided at an angle substantially the same as the angle of the inclined surface 45 on the end plate 13.

Control means, indicated generally at 59, is provided for controlling the movement of the extruder door 47 with respect to the end plate 13. The control means 59 comprises a rod 61 connected to the extruder door 47 by suitable means such as a dowel pin 63. The rod 61 is threaded on its radially outwardly extending portion, and a hub member 65, including a sleeve portion 67, is threadily received on the rod 61. The sleeve member 67 is also connected to a handle 69. The rod 61 and sleeve member 67 are adapted to be received in the grooves or slots 37 and 39 in the mounting portion 25 and abutment member 27, respectively. The hub portion 65 is adapted to be received in the opening 41 and is adapted for abutting engagement with the sides of the mounting portion 25 and the abutment member 27. It should be noted that when the control means 59 is positioned in the slots 37 and 39, and the handle 69 is rotated in a first direction, the sleeve member 67 is rotated on the rod 61 until the hub member 65 engages the abutment member 27. Thereafter further rotation of the handle 69 serves to move the rod 61 and thereby the extruder door 47 leftwardly due to the continued rotation of the hub member 65 on said rod with the movement of said hub member being restricted. The threads on the hub member 65 and rod 61 act to pull the rod through said hub member when the movement of said hub member is restricted. When the handle 69 is rotated in the opposite direction, the sleeve member 67 is rotated on the rod 61 until the hub member 65 engages the mounting portion 25 and thereafter further rotation of the handle 69 serves to move the rod 61 and thereby the extruder door 47 rightwardly, in the same manner as previously discussed.

To complete the description of the end plate and door assembly, it should be noted that the slots 51 are of sufficient length to enable the extruder door 47 to be moved leftwardly a sufficient amount to permit the clearance of the angled surface 57 from the angled surface 45 on the end plate 13. In this manner the door 47 may be readily swung or pivoted about the pin 33 enabling an operator to get to the interior or extruder barrel 5.

In the operation, the extruder door 47 is initially in the position indicated by the dotted lines in FIG. 1. When it is desired to close the door 47, said door pivoted about the hinge pin 33, and due to the clearance afforded by the slots 51, the angled surface 57 and flange 55 on said door are able to pass the angled surface 45 on the end plate 13. The rod 61 is received in the groove 37, and the sleeve 67 is received in the groove 39 with the hub member 65 being received in the opening 41. Thereafter, the handle 69 is rotated in a direction whereby the sleeve 67 serves to move the hub portion 65 leftwardly into engagement with the mounting portion 25. Thereafter further leftward movement of the hub 65 is prevented, and continued rotation of the handle 69 serves to pull the threaded portion of the rod 61 rightwardly. As the rod 61 moves rightwardly the door 47 is pulled therewith, and the abutment surface 57 is brought into engagement and urged rightwardly along the abutment surface 45 with the flange 55 being received in the undercut 43. Since the angle of the slots 51 is substantially identical to the angle of the inclined surface 45, the rightward movement of the extruder door 47 serves to move said extruder door toward the seal ring 23 in the end plate 13. By the sufficiently pulling the extruder door 47 rightwardly up the angled surface 45, said extruder door is moved into sealing engagement with the seal ring 23, establishing a fluid pressure tight seal between the end plate 13 and door 15 about the opening 19. With the extruder door 47 in this position it is possible for the extruder 1 to be operated in its normal manner and the material being extruded will pass from the barrel 5 and opening 19 through the die opening 53. Should an emergency arise or the operator desire to open the door, it may be readily accomplished by rotating the handle 69 in the opposite direction, thereby moving the hub 65 rightwardly into engagement with the abutment member 27. Thereafter further rightward movement of the hub 65 is prevented and continued rotation of the handle 69 serves to move the rod 61 leftwardly to a position disengaging the abutment surfaces 57 and 45 and permitting the door 47 to be pivoted outwardly about the pivot pin 33. It should be noted that a slight clearance is provided by the opening 41 for receiving the hub 65. This slight clearance is desirable, since the handle 69 will be moving with some momentum before it is effective in moving the rod 61 leftwardly. In this manner the necessary force is attained for initially moving the extruder door 47 leftwardly, to release the pressure in the extruder barrel 5 and open said door.

The angle of the slots 51, as well as that of the angled inclined surface 45, preferably should be 15° or greater to the opening 19 in the end plate 13. It is preferable that this angle be maintained 15° or greater to prevent mechanical locking due to the frictional force established between the angled inclined surfaces 57 and 45. It has been found desirable that this angle should be maintained between 15 and 20° to the opening 19 for best results, although angles in excess of 20° may be utilized. As is obvious, the greater the angle of the inclined surface 45 and slots 51, the more directly the pressure asserted in the extruder barrel 5 must be absorbed by the control means 59. In other words, the larger the angle provided on the inclined surface, the larger the screw force provided by the sleeve 67 and rod 61 must be to counteract the internal pressure of the extruder acting on the door 47. In addition, it should be noted that by providing an inclined angle of between 15 and 20° to the opening 19, the resultant force on the flange 55 is such that the door 47 may be moved leftwardly to release the fluid pressure seal by said door and the seal ring 23 with a minimum of effort on the handle 69.

From the foregoing, it is now apparent that a novel extruder door has been described meeting the objects and advantages heretofore set forth and that modifications or changes as to the precise configurations, shapes and details of the construction set forth by way of illustration may be made without departing from the spirit of the invention, as defined by the claims which follows. The embodiments of the invention in which an exclusive property or privilege is claimed are defined as follows:

I claim:

1. An extruder door assembly adapted for use with an extruder which conveys material therethrough, comprising an end plate on said extruder having an opening therein for the material to pass therethrough, an extruder door pivotably connected to said end plate and having an opening therein adapted for alignment with said end plate opening, an angled surface on said extruder door engageable with said end plate, and control means connected to said extruder door for controlling the movement of said angled surface on said end plate, said control means being responsive to a manual force to move said angled surface between a position disengaged from said end plate and a position in locking engagement with said end plate to establish a pressure fluid seal between said end plate and extruder door about said end plate and door openings.

2. The extruder door assembly according to claim 1 including another angled surface on said end plate, said first named angled surface on said extruder door being moveable on said other angled surface for urging said extruder door toward said end plate.

3. The extruder door assembly according to claim 2 wherein said control means comprises a threaded rod member connected to said extruder door, a hub member threadily received on said rod member, a slot having opposed sides in said end plate for receiving said hub member, said hub member being engageable with the opposed sides of said slot to limit the movement thereof on said threaded rod, said hub member being movable in response to a manual force into engagement with one of said opposed sides of said slot and thereafter the manual force being effective to move said rod member and urge said first named angled surface along said other angled surface.

4. The extruder door assembly according to claim 1, including a pivot pin in said end plate, a slot in said door adapted to receive said pivot pin for pivotal connection of said door to said end plate, said slot permitting pivotal movement of said door about said pivot pin as well as permitting horizontal movement of said door a second angled surface on said end plate adapted to receive said first named angled surface on said extruder door, said control means being effective to urge said first named angled surface along said second angled surface to move said door toward the position establishing the fluid pressure seal between said end plate and said door.

5. The extruder door assembly according to claim 4 wherein the sides of said slot are positioned at an angle substantially the same as the angle of said second angled surface.

6. The extruder door assembly according to claim 1, including an annular seal in said end plate about said end plate opening, said extruder door being movable into engagement with said annular seal to establish the pressure fluid seal.

7. The extruder door assembly according to claim 2 wherein said control means includes a rod attached to said extruder door, said rod being movable between a first position permitting said door to be moved to a position for pivotable movement about said pin and a second position establishing engagement between said first named and other angled surface, said rod being movable in response to a manual force when in the second position to effect the movement of said first named angled surface on said other angled surface.

8. The extruder door assembly according to claim 7, including a slot in said end plate for receiving said rod, an opening having opposed sides in said end plate intermediate said slot, said control means including a hub member adapted for insertion into said opening, said hub member being engageable with the opposed sides of said opening to restrict its movement, said hub member being movable on said rod into engagement with one of said opposed walls in response to a manual force in a first direction and thereafter the manual force in the first direction being effective to move said rod in a first direction toward the first position, and said hub member being movable into engagement with the other of said opposed walls in response to a manual force in the opposite direction and thereafter the manual force in the opposite direction being effective to move said rod in the opposite direction to urge said first named angled surface along said other angled surface.

9. The extruder door assembly according to claim 8, including a hinge pin in said end plate, slot means in said door for receiving said hinge pin, movement of said rod in the first direction serves to urge said door along said hinge pin and said first named angled surface toward a position disengaged from said other angled surface to permit said extruder door to be moved out of the pressure fluid seal with said end plate and permits said door to be pivoted about said hinge pin away from said end plate.

10. The extruder door assembly according to claim 8, including a hinge pin in said end plate, slot means in said extruder door for receiving said hinge pin, said slot means being provided in said door at an angle to the opening in said door substantially similar to the angle said other angled surface defines with the opening in said end plate.